United States Patent [19]
Victorino

[11] 4,439,093
[45] Mar. 27, 1984

[54] CARTON HANDLING SYSTEM

[75] Inventor: Robert W. Victorino, Salinas, Calif.

[73] Assignee: Growers Vacuum Cool Company, Salinas, Calif.

[21] Appl. No.: 399,437

[22] Filed: Jul. 19, 1980

Related U.S. Application Data

[63] Continuation of Ser. No. 139,865, Apr. 14, 1980, abandoned.

[51] Int. Cl.³ .................. B65G 59/08; B65G 67/04
[52] U.S. Cl. ..................... 414/786; 414/28; 414/38; 414/112; 414/783
[58] Field of Search ............. 414/28, 29, 38, 110, 414/112, 113, 121, 347, 405, 416, 754, 762, 763, 764, 765, 783, 786, 771, 773

[56] References Cited

U.S. PATENT DOCUMENTS

| | | | |
|---|---|---|---|
| 2,792,133 | 5/1957 | Warner | 414/116 X |
| 2,822,933 | 2/1958 | Pagdin | 414/121 |
| 3,075,652 | 1/1963 | McCoy | 414/330 |
| 3,123,232 | 3/1964 | Postlewaite | 414/29 |
| 3,190,461 | 6/1965 | Postlewaite | 414/764 X |
| 3,404,787 | 10/1968 | Hayford | 414/121 X |
| 3,788,496 | 1/1974 | Webb et al. | 414/39 |
| 3,946,880 | 3/1976 | Schmitt | 414/783 X |
| 4,018,351 | 4/1977 | Stobb | 414/112 X |
| 4,037,734 | 7/1977 | Erdman | 414/112 X |
| 4,051,958 | 10/1977 | Richardson et al. | 414/112 |
| 4,268,201 | 5/1981 | Cayton | 414/69 X |

Primary Examiner—Leslie J. Paperner
Attorney, Agent, or Firm—Gerald L. Moore

[57] ABSTRACT

A system and apparatus for the handling of cartons such as those in which lettuce heads are packed. The cartons are carried from the field on pallets, through a cooling chamber and mechanically loaded onto transport vehicles for shipment to the market. Special apparatus is provided for removing the pallets from the carton stack and for stacking the cartons at varying heights prior to loading into the transport vehicles. In addition a method and apparatus are provided for mechanically loading the transport vehicles with the cartons being stacked in a stable manner to prevent damage to the contents during shipment.

9 Claims, 27 Drawing Figures

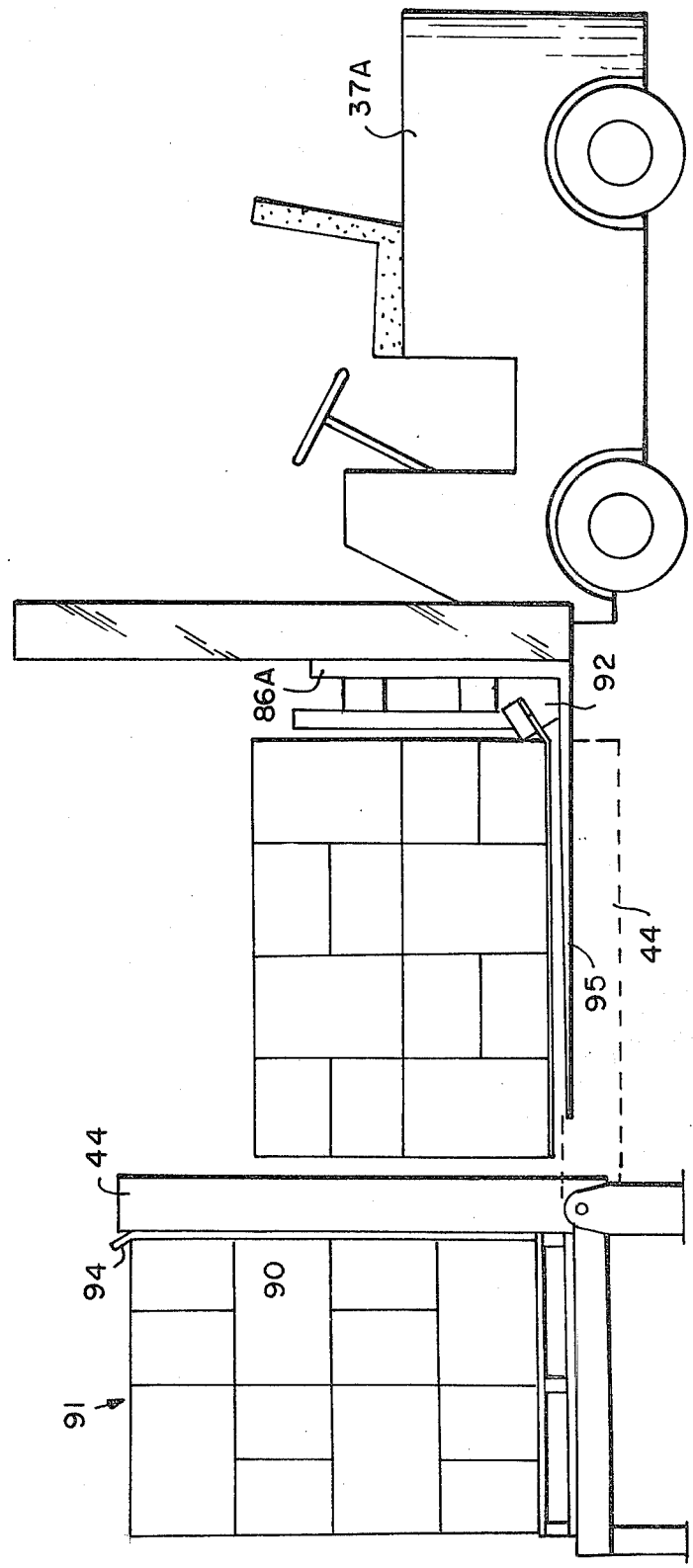

CARTON HANDLING SYSTEM

This is a continuation, of application Ser. No. 06/139,865, filed Apr. 14, 1980, now abandoned.

BACKGROUND OF THE INVENTION

The present invention relates to a method and apparatus for handling cartons, especially cartons of the type in which lettuce is packed for shipment to the market. Lettuce is harvested in the field and packed into cartons for transport to a cooling and shipping location. Since lettuce heads are of various sizes and the cartons are preferably packed with the same number of heads, frequently the tops and/or bottoms of the cartons bulge. The bulging causes instability when the cartons are stacked thereby making difficult the transportation from the field on the field trucks and the subsequent loading in transport vehicles for shipment to the market.

In the field the lettuce cartons are usually stacked on pallets carried by field trucks for transportation to the cooling and loading location. Cooling is accomplished by drawing a vacuum on the lettuce which causes rapid evaporation and the resultant lower head temperatures. A lift truck is used to shift the loaded pallets from the field truck onto a transport mechanism which carries the pallets through the cooler. Thereafter the cartons must be moved to the transport vehicles which in the usual case are trailer trucks.

Prior to loading onto the transport vehicles the pallets must be removed for re-use thereby making it necessary that the cartons be loaded without pallets. The truck trailers are of various widths usually ranging between 88 and 91 inches or 2.33 to 2.31 meters wide. In the past the cartons have usually been transported to the vehicles in single file on conveyors and hand stacked in the vehicles, a time-consuming, expensive and difficult procedure.

The overall purpose of the present invention is provide a system for handling cartons in a manner to make use of mechanical devices for unitized loading and such that the cartons are efficiently loaded and closely positioned to limit damage during shipment.

SUMMARY OF THE INVENTION

A carton handling system especially adapted for the transportation, cooling and loading of cartons of lettuce comprising a method of transporting the cartons from the field on pallets and shifting the loaded pallets into a vacuum chamber, means for receiving the cooled cartons on pallets from the vacuum chamber and transporting them to a pallet removing apparatus for separating the stacks from the pallets. The pallet removal apparatus comprises wing members for holding and rotating the carton stack 90° and compressing the stack prior to depositing it onto a platform from which it can be picked up by use of a forklift truck. The platform is then rotated back to its original position to receive another carton stack and the pallet is removed and stacked mechanically to one side to be picked up for re-use. A forklift truck is used to pick up the carton stack from the platform and transport it into the transport vehicle for shipment to the market. Apparatus is also provided for removing layers of cartons from the carton stack for the loading of cartons in stacks other than the standard height as received on the pallet.

DESCRIPTION OF THE DRAWINGS

FIG. 20 shows the forklift truck utilizing slip sheets to support and move the carton stack.

DESCRIPTION OF THE INVENTION

Figure 1:
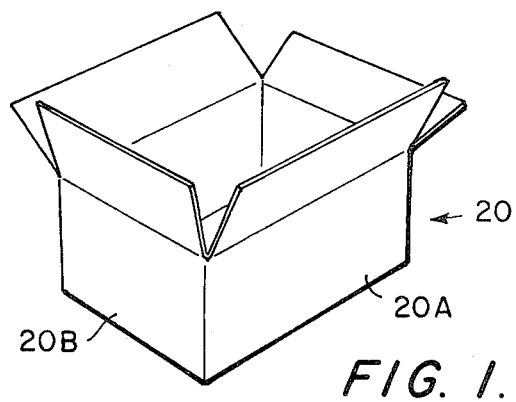
FIG. 1 is a perspective view of a carton commonly used to hold lettuce heads for shipment.
Figure 5:
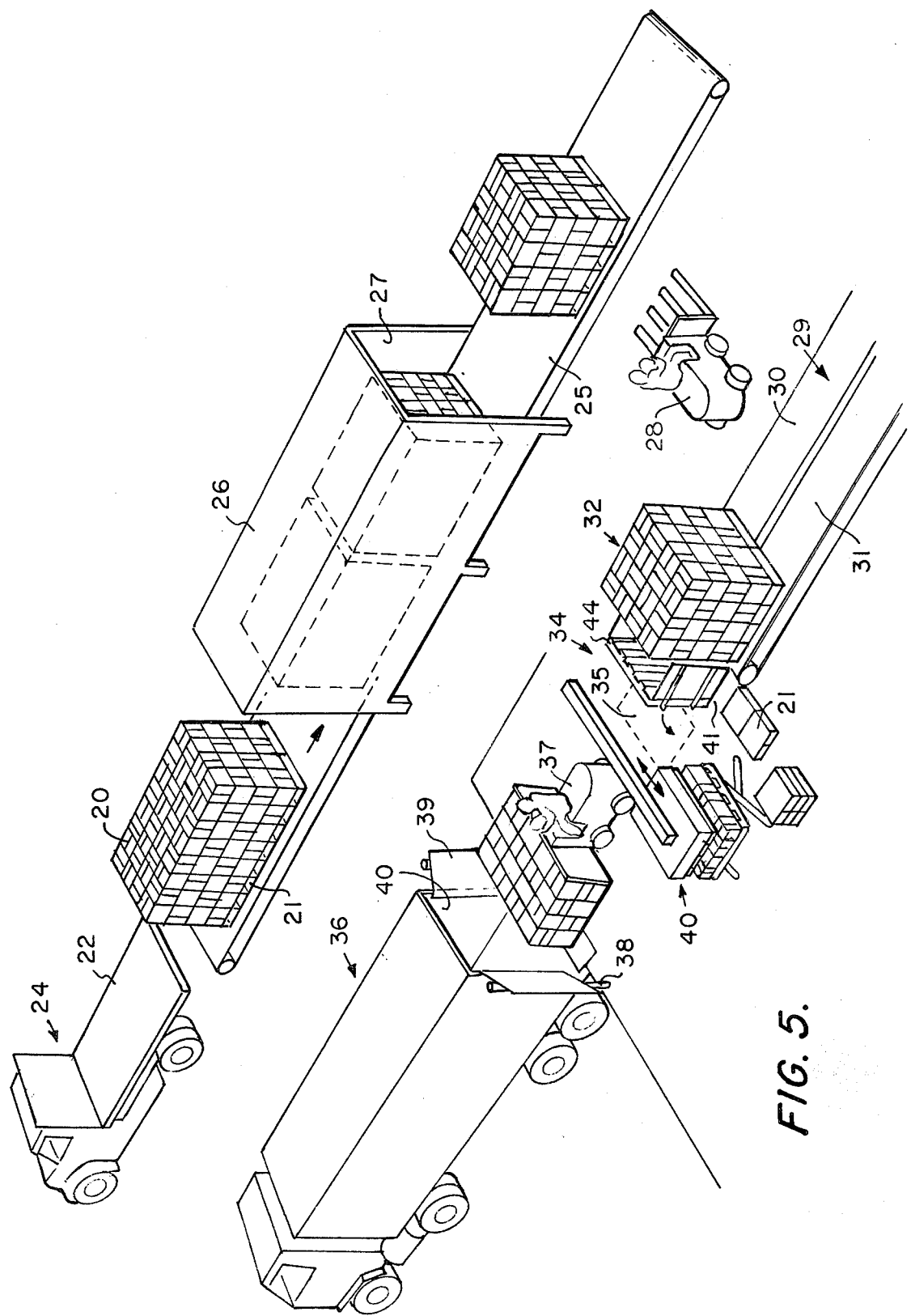
FIG. 5 is a perspective view of the overall system for handling and loading cartons.

A schematic view of the invention is illustrated in FIG. 5. In this embodiment the invention is utilized for the handling of produce cartons such as those used for the shipping of heads of lettuce. The lettuce is received from the field in the cartons 20 (FIG. 1) placed in carton stacks on pallets 21 on the bed 22 of the field truck 24 (FIG. 5).

In the usual instance each carton 20 includes approximately 24 heads of lettuce and weights between 40 and 60 pounds. The lettuce must be cooled prior to shipment to the market and for that purpose the pallets are transferred by lift truck to a conveyor 25 to be carried through a vacuum cooler 26. In the vacuum cooler the pressure is reduced to approximately 5 psi and within 20 or 30 minutes, the lettuce temperature is lowered to around 34° F. Such vacuum coolers are well-known. After cooling, the cartons are conveyed through the cooler exit 27 to be picked up by a forklift truck 28 for transport to a second conveyor 29.

In the past the cartons have usually been transferred by hand onto the second conveyor (not shown) for movement in single-file order to the transport vehicle. The cartons are usually loaded from the conveyor into the truck or freight car by skilled loaders who stack them in a manner so they will not shift when the vehicle is underway. Naturally, loading in this manner is slow and expensive. In addition, the longer it takes to transfer the cartons from the vacuum cooler to the transport vehicle, the more the temperature rises towards the environmental temperature.

Figure 1A:
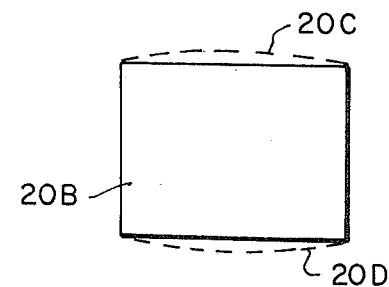
FIG. 1A shows the carton filled and bulging.

Handling of the cartons either by field vehicle or lift truck is complicated by the fact that the cartons filled with lettuce heads frequently do not retain flat or planar top and bottom surfaces but instead bulge considerably in the manner shown in FIG. 1A. The overall object is to move the cartons with a minimum of effort from the field, through the cooler and into the transport vehicle. The carton itself includes stiff side panels 20A and end panels 20B. Preferably the cartons are stacked with these four side and end panels positioned vertically to partially support the weight of the stacked cartons. However with the top 20C and bottom 20D usually bulging in the manner shown, stacking of the cartons in a stable manner is essentially impossible.

When transporting the loaded pallets from the field, it is advantageous to stack the cartons in a manner that does not require strapping or other ties to prevent the load from shifting or falling off. This can require that most of the cartons be placed with a side panel down to take advantage of the flat surface. But for long distance transporting, it is better to take advantage of the stiff sides to reduce the vibrating load on the lettuce heads.

Figure 2A:
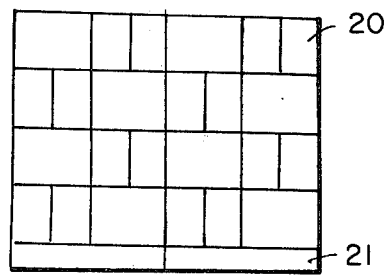
FIGS. 2A, 2B, 3A, 3B, 4A and 4B show various methods of stacking carbons for handling and shipment.
Figure 2B:
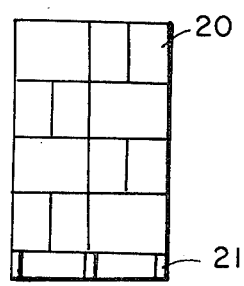
Figure 2C:
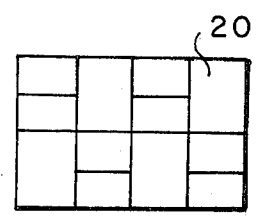
FIGS. 2C, 3C and 4C show the respective stacks rotated 90°.
Figure 4A:
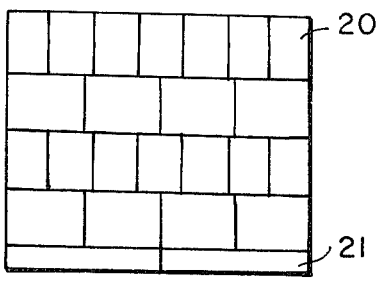
Figure 4B:
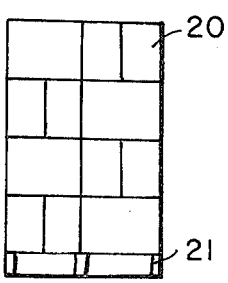
Figure 4C:
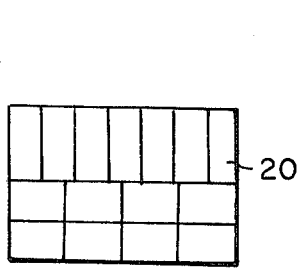

Accordingly several configurations of loading have been devised. In FIGS. 2A and 2B the cartoows. Therefore the stack is less stable than that of FIG. 2A. In FIGS. 4A and 4B the cartons are also stacked on the side panels and there is some overlapping between adjacent horizontal layers to add stability to the load.

Thus there are provided various configurations for stacking the cartons for transportation from the field to the cooling plant. However, as will be pointed out later, the best field load stacking may not provide the optimum stacking for subsequent loading into the transport vehicles and such considerations as stack dimensions and the ability to remove individual layers from the stack may be more important in determining the stack configuration that is most optimum.

In accordance with the present inventon, there is provided a system for handling and loading the cartons from the time they are packed in cartons in the field until they are loaded into a transport vehicle for shipment to the market. For this purpose the conveyor 29 which carries the loaded pallets to the loading platform is constructed to carry two pallets positoned side-by-side. With the cartons transported in stacks on pallets there remains the necessity to remove the pallet from the stack since the pallets are not shipped in the transport vehicles. In addition it is necessary to stack the cartons at varying heights in the transport vehicles depending upon the dimensions of the vehicle trailer and the weight limitations of that vehicle. Rotation of the carton stack is preferable because, as pointed out before, the carton positioning for hauling from the field is not usually the best for long distance shipment in the transport vehicle.

The carton stacks on the pallets are of a preselected height usually controlled by the stability of the cartons on the pallet and the dimensions of the vacuum cooler. Frequently the vertical height of a pallet load is not high enough to satisfactorily load the transport vehicle, therefore layers must be added to the normal carton stack. An example of the need to add such layers is shown in FIG. 19 wherein the darkened line illustrates a four carton height in the front stack while other stacks include six and eight carton layers thereby requiring the addition of the layers to the standard carton stack received on a pallet.

Accordingly the subject invention provides mechanical apparatus for separating the pallet and the carton stack and for adding or subtracting carton layers from a standard stack such that the cartons can be loaded into the transport vehicle in varying heights by use of a lift truck. In additon two carton stacks are joined side-by-side and compressed to be slightly less than the width of the transport vehicle so that all loading is accomplished by use of the lift truck, hand-loading is unnecessary and yet the load is closely spaced to prevent movement during shipment.

The conveyor 29 is two pallets wide and in this embodiment is comprised of two conveyor belts 30 and 31 which transport pallets with edge-stacked cartons in side-by-side relationship to a holding station 32. At this holding station the loaded pallets are shited two at a time onto a pallet remover or rotator 34 positioned in a first position to receive the loaded pallets. This rotator compresses and tips carton stacks and pallets forward in pairs through an angle of 90° to a second position on a base 35. Since in most instances the cartons are previously positioned on edge, they are now positioned with a larger side horizontal for loading onto a transport vehicle 36. The cartons are lifted from the base 35 by a forklift truck 37 and moved between the stationary guides 38 and 39 into the trailer 40.

Figure 18:
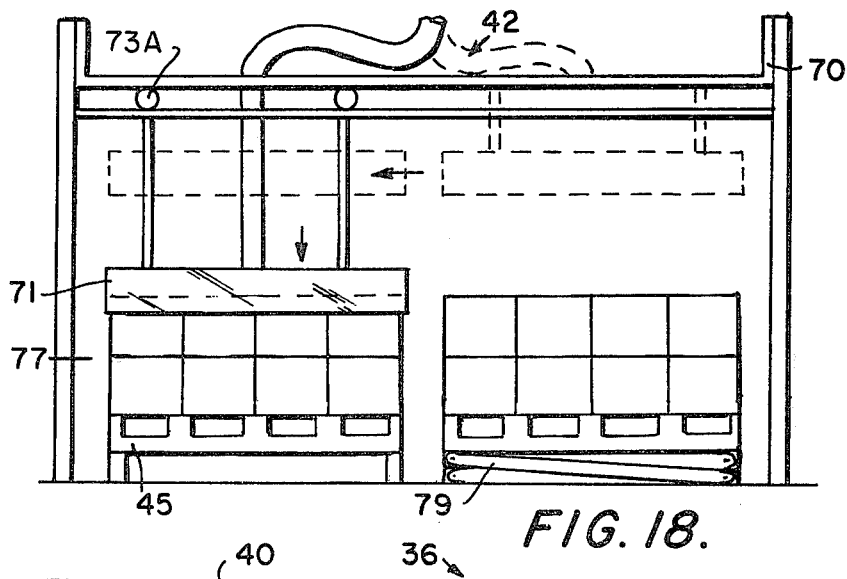
FIG. 18 shows the stacking apparatus positioned to remove a layer from the carton stack.
Figure 19:
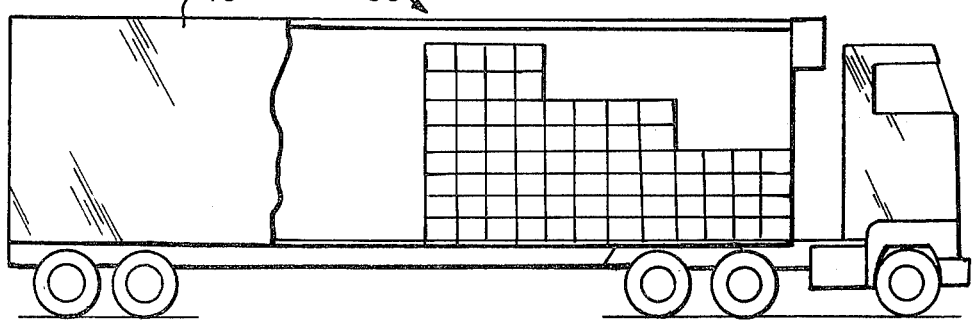
FIG. 19 shows the carton stacks in the vehicle.

As shown in FIG. 19 such transport vans frequently require stacking at levels higher than the normal four layers loaded on the pallet requiring that layers of cartons must be loaded on top of the standard pallet load. For this purpose there is provided a stacker 40 (shown in FIGS. 5, 17 and 18) which is capable of transferring layers of cartons from the carton load positioned on the platform 35 to build up partial loads necessary for adding to the top of an existing standard pallet stack to load the vehicle to the weight limit. These partial loads are assembled mechanically for movement by a lift truck into the transport vehicle.

The carton stack rotator or pallet remover is shown in FIGS. 5, 6, 7 and 8 and comprises a first base 41 for supporting a plurality of rollers 42 having the tops thereof positioned level with the top of the conveyor belts 30 and 31. Thus as these conveyor belts are driven forward the leading two pallets with carton stacks are moved onto the rollers 42 to a position abutting a frame 44. The frame 44 stands vertically and is pivotally attached to a base 35 by pedestals 46 through which pins 47 extend. The frame 44 supports an upper beam 48 and a lower beam 49. Fixed to the base 41 on each side is a stanchion 50 extending diagonally upward and pivotally connected to a hydraulic actuator 51 positioned on each side of the second base 35. By suplying pressured fluid from a source (not shown) to these actuators the stanchion is pulled in a direction to pivot the base 41 from the horizontal position to the vertical position around the supporting pins 47. In this manner the pallet and carton stacks are rotated 90° until the base 41 extends vertical.

There are provided side pressure plates 52 which can be moved towards each other to exert a horizontal gripping pressure against the sides of the carton stacks to hold, align and compress the cartons. These pressure plates are supported on a frame comprising upright members 54 fixed to horizontally extending beams 55 supported by guide members 56 fixed to the upper and lower beams 48 and 49, respectively. A hydraulic actuator is connected between the upright members 54 by crosspieces 58 such that when actuated, the pressure plates will be pulled together or pushed apart. After the two pallets with stacked cartons are moved onto the rollers 42, the actuator 57 is energized to bring the pressure plates 52 towards each other to contact and hold the cartons in place. The actuators 51 are then energized to initiate turning of the carton rotator 90° and bring the base member 44 to the horizontal position. After the rotator is partially rotated the pressure on the side panels is released for the remainder of the period it takes to move the base memer to the horizontal position. Subsequently the pressure is resumed to align the cartons and thereafter the pressure is released again. The base member includes tineways 59 into which the tines of the forklift truck can be fitted. With release of the pressure on the pressure plates 52, the cartons can be picked up by the forklift for movement to the transport vehicle.

The pressure on the side panels is released during the later portion of rotation of the rotator to allow the cartons to settle down on the base 44. If the sidewise pressure is maintained on the side panels to continue the squeezing of the carton stacks, the cartons can interfere with one another and not settle downward toward the base. By release and resumption of the pressure, the cartons are allowed to settle and the subsequent pressure will realign the stack for pickup by the lift truck.

Figure 6:
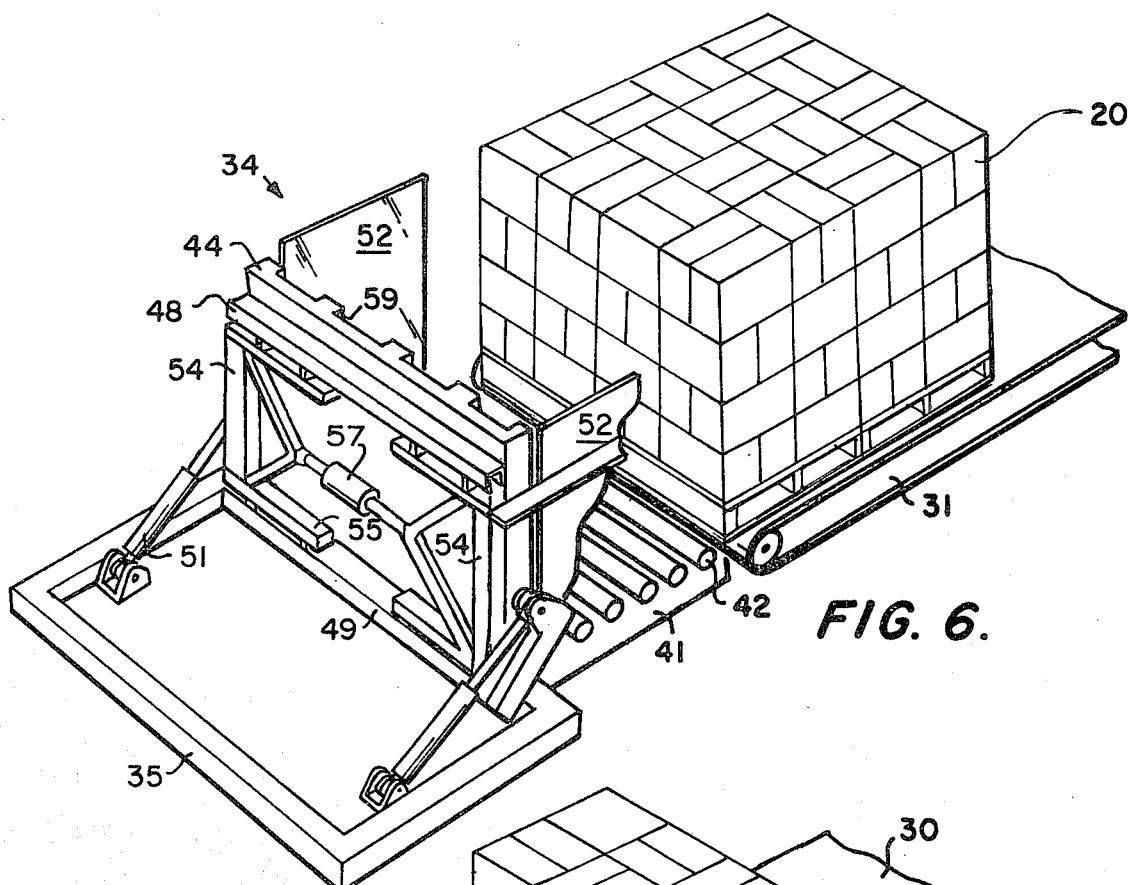
FIG. 6 shows the carton stack rotator in position to receive a carton loaded pallet.
Figure 7:
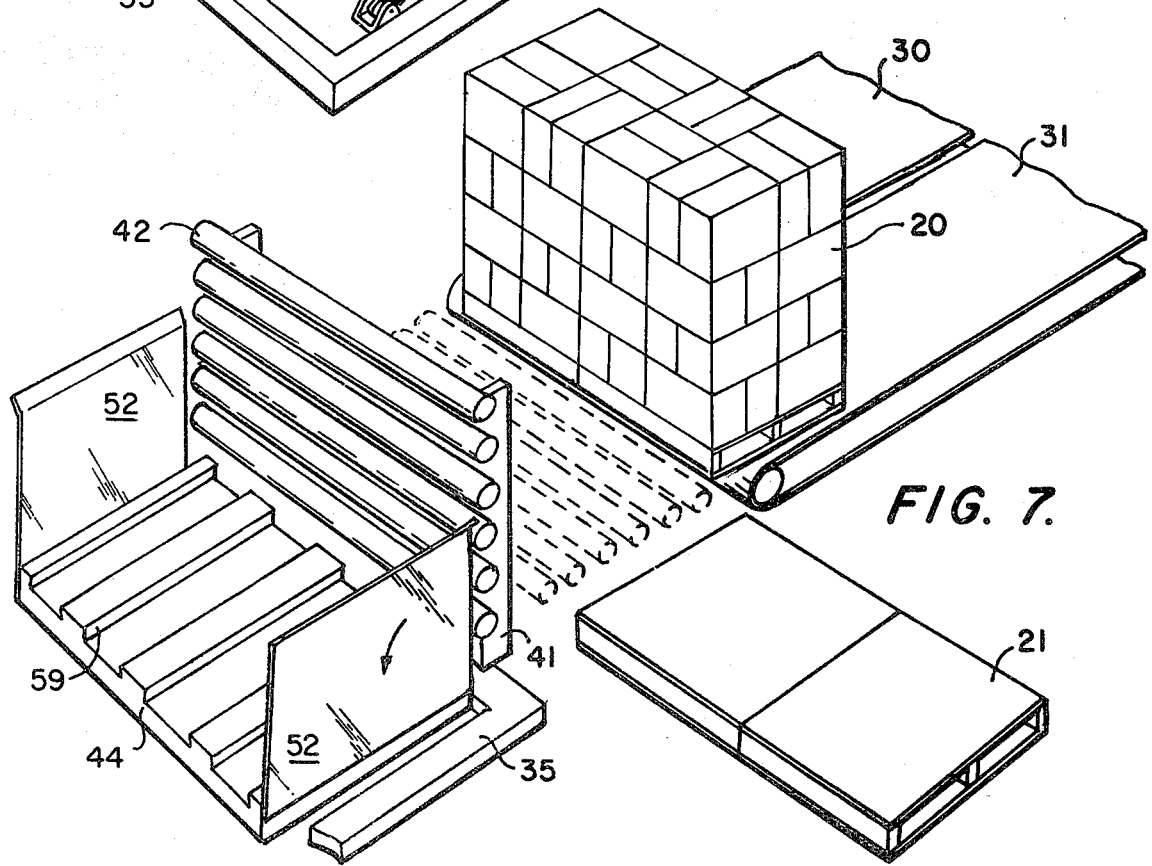
FIG. 7 shows the carton stack rotator after rotation.
Figure 8:
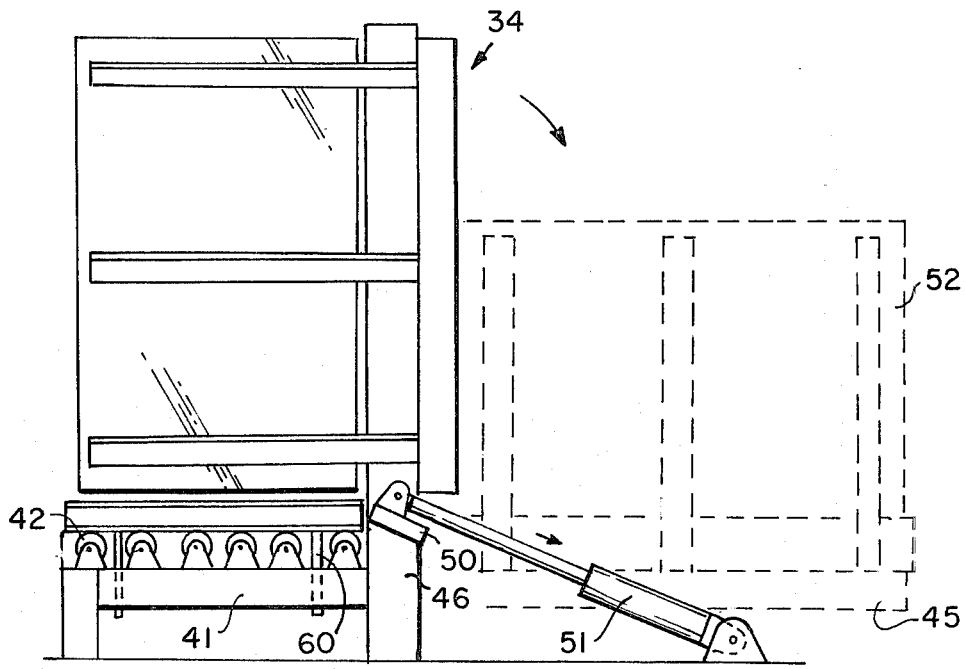
FIG. 8 is a side view showing the two positions of the carton stack rotator.

When the stacked cartons are removed from the carton rotator, the actuator 51 is energized to return the carton rotator to the receiving position shown in FIG. 6. The empty pallets remain on the carton rotator after the cartons are removed and the base 41 is returned to the horizontal position. For removal of the pallets, there is positioned beneath the base two pairs of sprockets 60 and 61 spaced apart for supporting parallel-positioned drive chains 62. The sprockets are positioned such that the endless drive chains align with spaces between the rollers 42.

Figure 9:
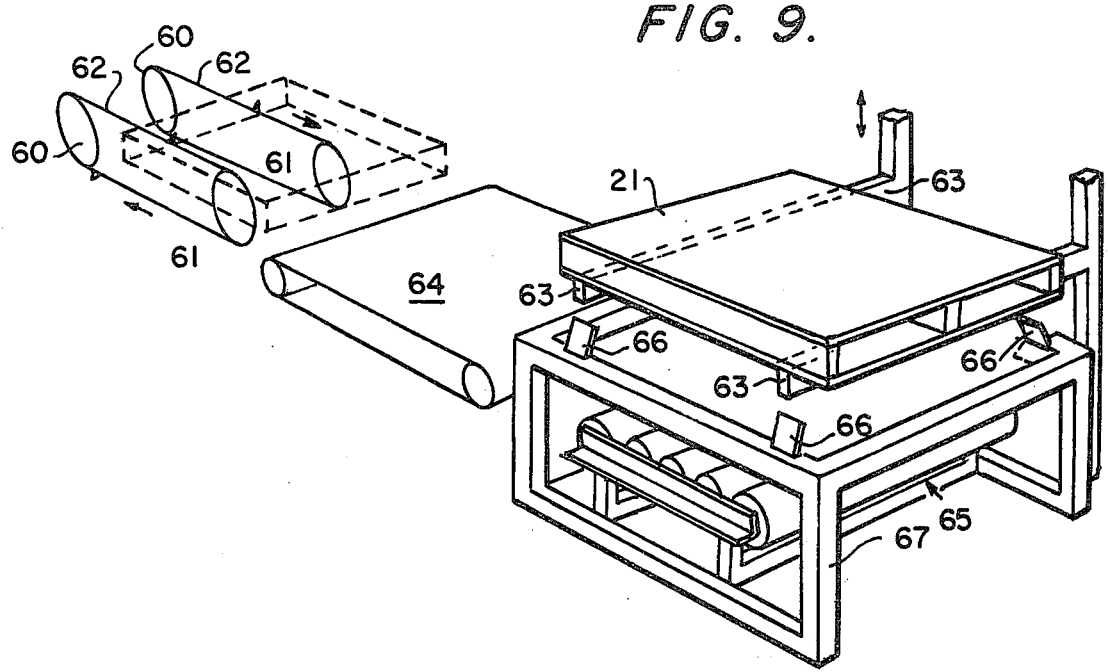
FIG. 9 shows the pallet stacker in perspective view.
Figure 10:
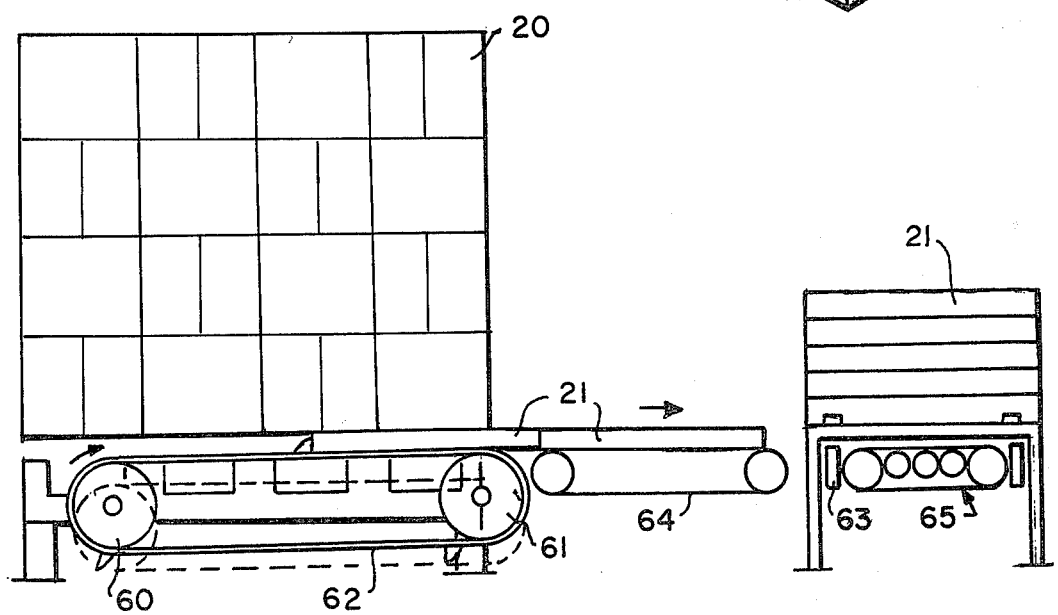
FIG. 10 is a side view of the pallet stacker.
Figure 11:
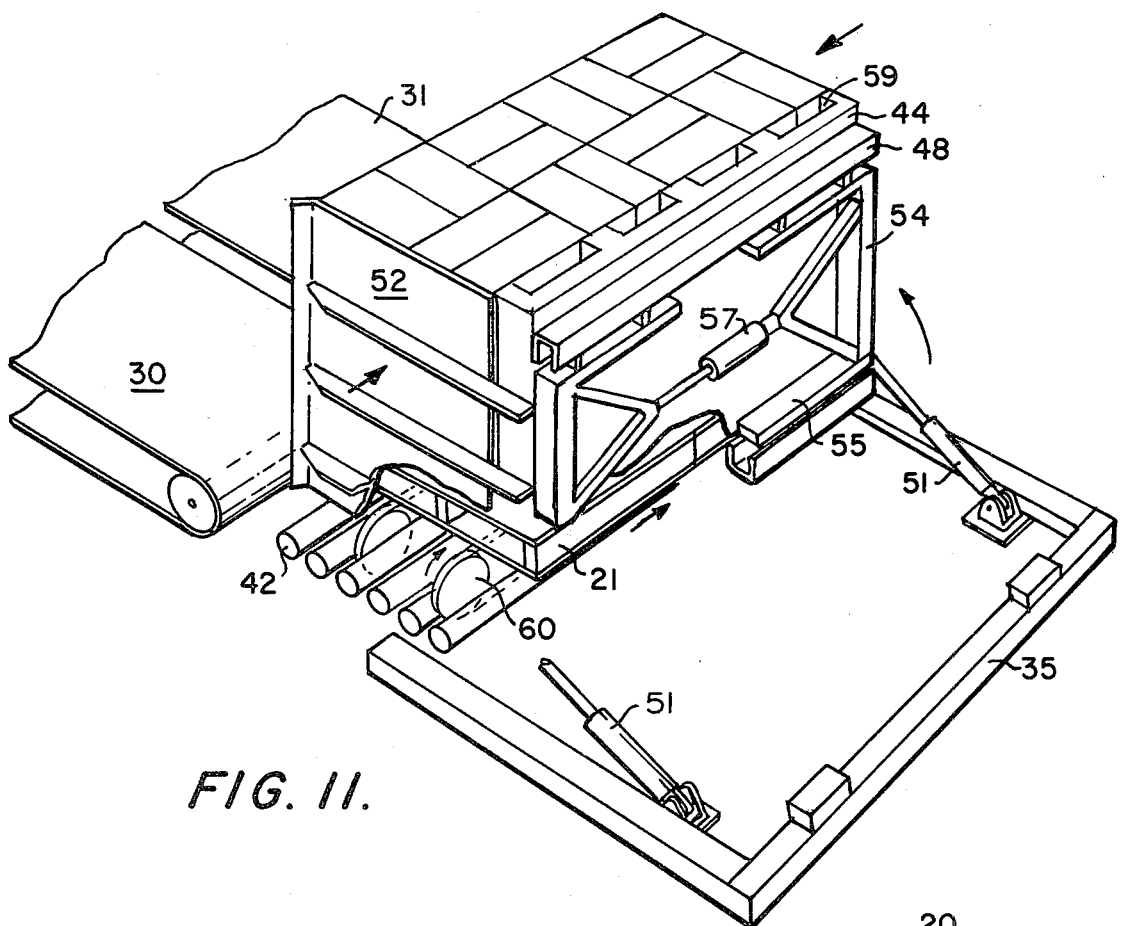
FIG. 11 is a perspective view of the carton stack rotator.
Figure 12:
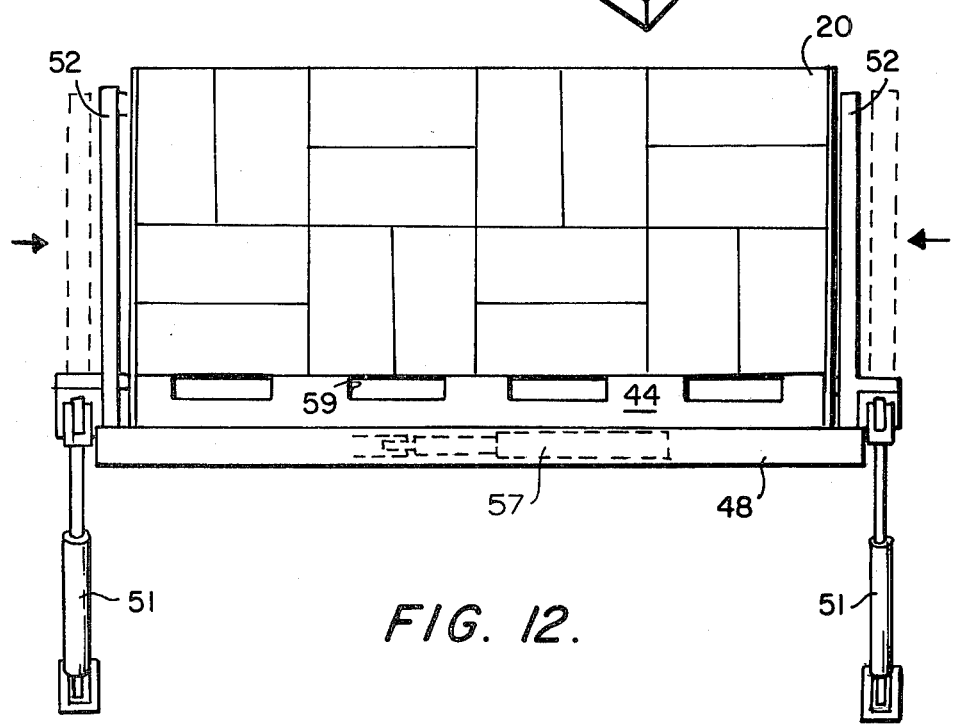
FIG. 12 is an end view of the carton stack rotator.

After the carton rotator is returned to the receiving position, actuators (not shown) are energized to raise the sprockets 60 and 61 to a position to shift the chains so the top half extends above the level of the tops of the rollers 42 and into contact with the bottom of the pallets resting on the rollers. Driving of the chains in the clockwise direction in FIGS. 9 and 10 moves the pallets onto a conveyor 64 for shifting to a subsequent conveyor 65. The pallets are moved in single file order and when the first pallet comes to rest on the conveyor 65, the arms 63 are lifted by actuators (not shown) to move the pallet vertically upward past the stop members 66 positioned to each side of the pallet. Thereafter the arms 63 are again lowered with the stops serving to prevent the pallet from dropping back downward. With subsequent raising of the next pallet, the already raised pallet will rest on the top of the pallet being raised and the stack will grow from the bottom. Thereafter the pallet stack can be picked up by a forklift and transported away to be used again. Thus in the manner described the pallets are automatically moved from the rotator and to the side in a manner so as not to interfere with the forward movement of the following loaded pallets.

As illustrated in FIG. 19 it is frequently necessary to load into the transport vehicle 36 not only a standard pallet of four layers of cartons but also partial stacks on top of the first pallet load. Such vertical stacking is necessary for proper weight distribution and efficient loading of the transport vehicle. For this purpose there is provided a carton layer transfer mechanism 42 as illustrated primarily in FIGS. 5, 17 and 18. When it is necessary for the next forklift load to be less than the normal pallet load, the pallet loads are moved onto the rotator and rotated 90° onto the base 35. Thereafter one or more tiers or layers of cartons are shifted, one at a time, from the pallet load prior to moving the pallet load into the transport vehicle. For this purpose a transfer structure 70 is positioned over and to the side of the base 35. The transfer structure is connected to a bonnet 71 by a plurality of hydraulic jacks 72 supported on a conveyance 74 mounted on rollers 73A supported on a rail 73B on the transfer structure. The conveyance 74 is shifted from a position over the base 35 to a position over a third position of holding base 75.

Figure 17:
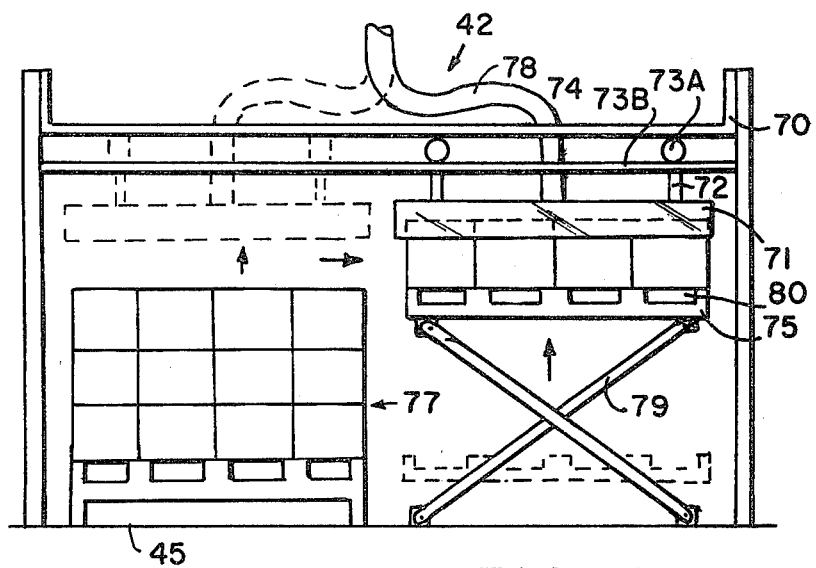
FIG. 17 shows the carton layer stacking apparatus.

The bonnet 71 is moved over the pallet load 77 and lowered downward by actuation of the jacks 72 until the bonnet fits over the top layer of the cartons as shown in phantom outline in FIG. 17. Thereafter by use of a vacuum pump (not shown) acting through the flexible pipe 78, the air pressure within the bonnet is lowered and by subsequent raising of the bonnet, the top layer of cartons is lifted upward above the carton load. Such lifting occurs because the top of the bonnet contacts the top of the cartons comprising the upper layer, and with a sufficient flow of air out of the bonnet and through the pipe 78, a low pressure zone is created between the carton tops and the bonnet to allow lifting of the cartons. Such lifting is only possible when the tiers comprise cartons positioned with the bottom 20D or a side panel 20A facing upward. Also it is usually necessary to squeeze the cartons together by use of the pressure plates 52 to position the cartons close together and limit air leakage between cartons before lifting by use of the bonnet.

By shifting the conveyance 74 and carton layer to the right and thereafter lowering the bonnet towards the holding base 75, the layer is deposited on the holding base. Thereafter by allowing air into the bonnet 71, it can be raised leaving the cartons on the holding base. Since it is preferable that the relatively slow-acting jack 72 not be actuated a distance equal to the complete height of a carton load, the base is placed on a scissors jack 79 which can be raised and lowered by an actuator (not shown).

Thus it can be seen that one layer at a time can be removed from a pallet load to enable the correct loading of the transport vehicle. In the instance shown in which the cartons are four layers high, one layer only is removed to complete the loading if only one layer is needed, this layer is shifted to the holding base 75 and picked up by the forklift truck. The truck forks fit into the tineways 80 to pick up the cartons and transport them to the transport vehicle. If two layers are needed then two layers are shifted, one at a time, to the holding base and the remaining cartons on the base 45 are moved into the transport vehicle. If three layers are needed then one layer is shifted to the base 75 and the remaining three layers of cartons on the base 45 are moved to the transport vehicle.

Figure 13:
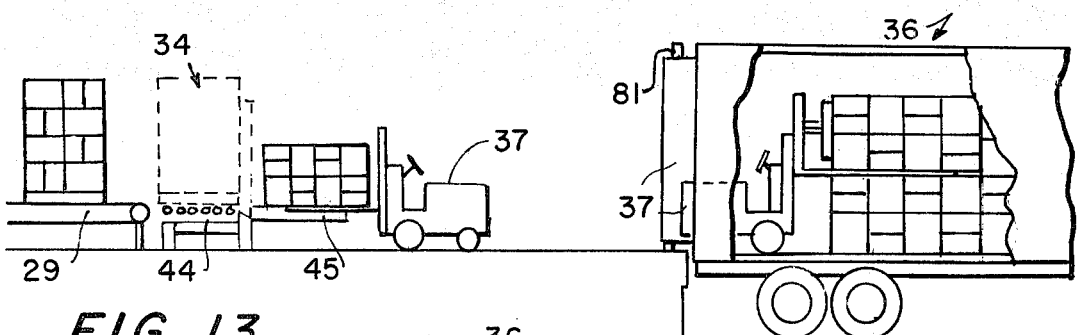
FIG. 13 shows the manner of unloading the carton stack rotator and loading the carton stacks into a transport vehicle.
Figure 14:
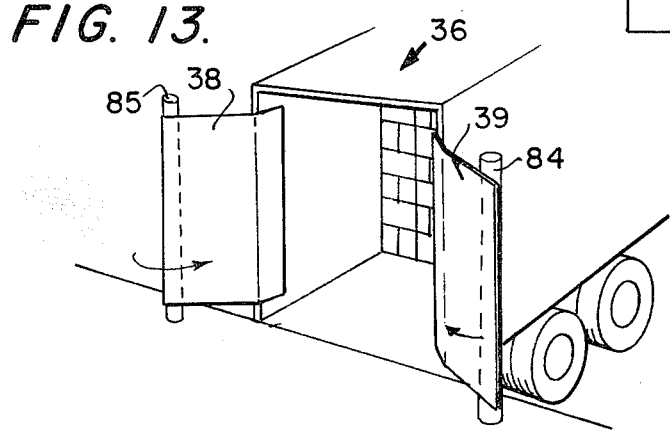
FIG. 14 shows the guides for directing the carton stacks into a transport vehicle.

As illustrated in FIG. 13 the forklift truck 37 is used to pick up and transport the carton stack from the base 45 to the transport vehicle 36. With the lift truck the cartons can be stacked as illustrated. In FIG. 14 there are provided guides 38 and 39 which are pivotally mounted on posts 84 and 85, respectively, adjacent the open end of the transport vehicle 36. These guides serve to direct the sides of the carton stack into the vehicle and are needed because the carton stack is very nearly the same width as the vehicle compartment.

Figure 3A:
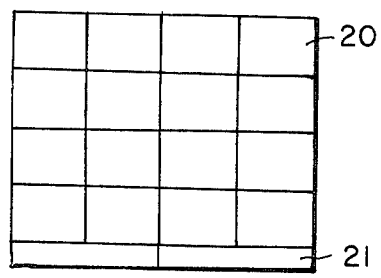
Figure 3B:
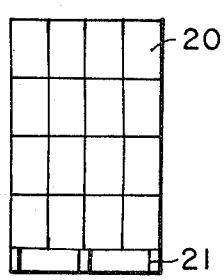
Figure 3C:
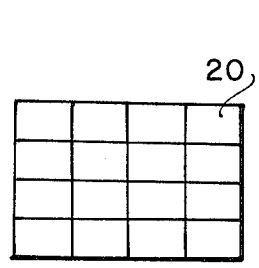

In past systems, such guides have been used for partially compressing the load to align it with the trailer cavity and attempt to reduce the width sufficiently to enable the carton stacks to move past the vehicle side walls. Attempts to compress the carton stacks by use of the guides 38 and 39 have frequently resulted in damage to the outside positioned cartons or in misalignment of the carton stack. The widths of the trailers vary sufficiently such that the carton stacks can be too wide for one trailer yet sufficiently narrow when loaded in another trailer that the cartons set loosely between the side walls and can be bounced around and damaged during shipment. Studies have revealed that most vehicle trailers have an inside width of from 85 inches (2.2 meters) to 91 inches (2.3 meters). The carton stacks shown in FIGS. 2A, 3A and 4A vary in width from 86 inches (2.2 meters) to 94 inches (2.4 meters).

Figure 15:
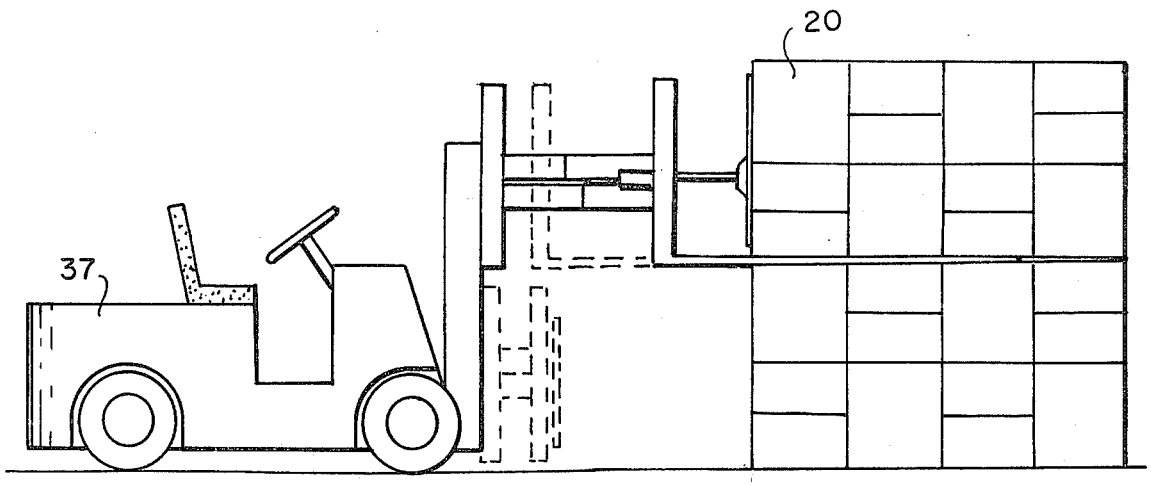
FIG. 15 shows the forklift truck transferring the carton stack to the transport vehicle.
Figure 16:
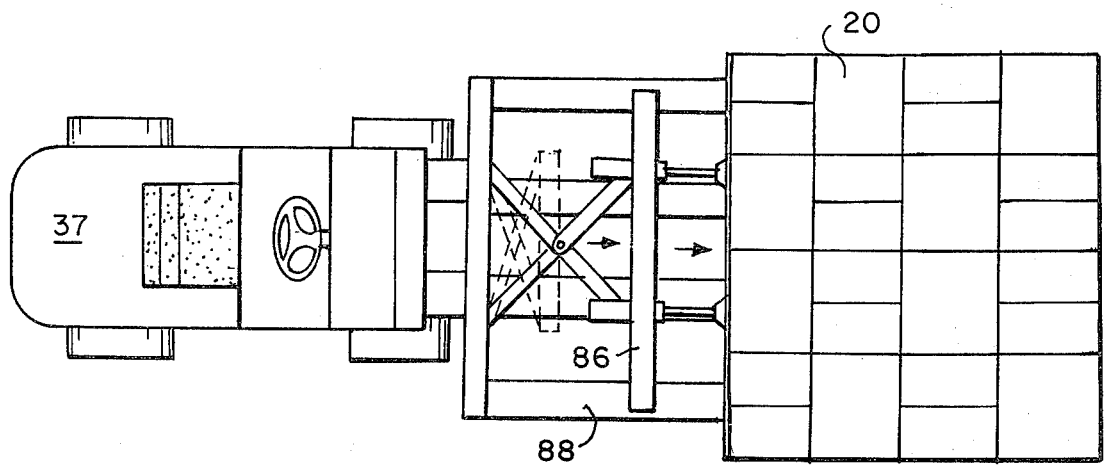
FIG. 16 is a top view of the apparatus shown in FIG. 15.

In accordance with another feature of the invention, the rotator is used to compress the carton stacks sufficiently to enable the loading of the trailers with a carton that is normally slightly wider than the trailer. The lettuce heads and cartons themselves are not damaged by such compression and soon relax and expand to fill the voids between and hold the cartons against movement during shipment. As illustrated in FIGS. 15 and 16 the forklift truck 37 includes a pusher element 86 which pushes the carton stack 87 from the forks 88 and into the proper position in the transport vehicle. Thus even though the carton stack is not positioned on a pallet, the forks can be withdrawn to allow positioning of the carton stack on another carton stack or on the floor of the vehicle.

As shown also in FIG. 20 there can be utilized a slip sheet 90 to assist in handling the carton stack. Such sheets are well-known and in this instance, the slip sheet is placed edgewise adjacent the base 44 prior to rotation of the carton stack onto the base. With rotation of the carton rotator, the carton stack 91 is then positioned on top of the slip sheet 90. The fork truck 37A is fitted with an apparatus 92 which grasps the extending edge 94 of the slip sheet to hold the carton stack positioned on the slip sheet on the tines or forks 95 of the lift truck. Thereafter the carton stack is unloaded in the transport vehicle in the same manner as previously described by actuation of the pusher element 86A.

Thus it can be seen from the foregoing that there is provided a complete system for mechanically loading cartons of any type into a transport vehicle without the use of pallets.

The invention claimed:

1. A carton handling method for moving cartons filled with lettuce heads from the field through a cooler and into transport vehicles having side walls and wherein the carton includes planar semi-rigid side and end walls and a top and bottom, said method comprising the steps of:

loading the filled cartons in stacks on pallets with the side walls facing downward and upward;

moving the loaded pallets through the cooler;

placing the loaded pallets on a carton rotator and rotating the loaded pallets from a first position approximately 90° to shift the carton load off the pallet and rotate the cartons to a second position with the bottom facing downward;

squeezing the carton stack on the loaded pallet while the loaded pallet is rotated to hold the carton load together and to align the cartons and reduce the size of the stack by moving pressure plates into engagement with two opposite sides of said carton stack and applying sufficient pressure to reduce the size of said carton stack sufficiently to fit between the side walls of the transport vehicle; and releasing the squeezing of the carton stack and removing the carton stack from the carton rotator and moving it into the transport vehicle and between the vehicle walls to allow the cartons to relax and engage the vehicle walls.

2. A carton handling method as defined in claim 1 including the step of releasing the pressure on the pressure plates during at least the last portion of the rotation of the loaded stacks to allow the cartons to settle downward onto each other when the stack is in the second position.

3. A carton handling system as defined in claim 2 including the step of removing and stacking the empty pallet after the carton stack is removed from the carton rotator.

4. A carton handling system as defined in claim 2 including the step of removing layers of cartons from the carton stack while the carton stack is in the second position on the carton rotator.

5. A method for handling pallets with cartons thereon and loading the cartons into a vehicle having side walls and wherein each carton includes planar semi-rigid side and end walls and a top and bottom, said method comprising the steps of:

placing the pallets and cartons on a carton rotator and rotating the pallets and cartons from a first position approximately ninety degrees to shift the carton load off the pallet and rotate the cartons to a second position onto a second base;

squeezing the carton stack on the pallet while the pallet is rotated to hold the carton load together and to align the cartons and reduce the size of the stack by moving pressure plates into contact with two opposite sides of said carton stack and applying sufficient pressure to reduce the size of said carton stack sufficiently to fit within a vehicle;

removing the pressure plates from contact with the carton stack, and removing the carton stack from the carton rotator and moving it into the transport vehicle to allow the cartons to relax and expand to engage the vehicle side walls.

6. A carton handling method as defined in claim 5 including the step of releasing the squeezing on the carton stack during at least the last portion of the rotation of the loaded pallets to allow the cartons to settle downward onto each other and onto the second base when the stack is in the second position.

7. A carton handling method as defined in claim 6 including the step of removing from the carton rotator the unloaded pallets after the carton stack is rotated.

8. A carton handling method as defined in claim 6 including the step of removing independent rows of cartons from the carton stack while the carton stack is in the second position on the carton rotator.

9. A carton handling method as defined in claim 5 including the step of removing rows of cartons from the carton stack while the carton stack is in the second position in the carton rotator.

* * * * *